US006446904B1

(12) United States Patent
Stanek

(10) Patent No.: US 6,446,904 B1
(45) Date of Patent: Sep. 10, 2002

(54) AIRCRAFT WEAPONS BAY HIGH FREQUENCY ACOUSTIC SUPPRESSION APPARATUS

(75) Inventor: Michael J. Stanek, Springboro, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/973,175

(22) Filed: Oct. 5, 2001

(51) Int. Cl.[7] ................................................. B64C 1/40
(52) U.S. Cl. ..................... 244/1 N; 244/130; 244/207
(58) Field of Search ............................... 244/1 N, 1 R, 244/204, 207, 130; 181/207, 208, 153, 155, 226; 381/7.5, 71.5

(56) References Cited

U.S. PATENT DOCUMENTS

| | | | |
|---|---|---|---|
| 2,749,064 A | * | 6/1956 | Kuhlman |
| 2,951,662 A | * | 9/1960 | Theodorsen |
| 3,934,846 A | * | 1/1976 | Maurer |
| 4,858,850 A | * | 8/1989 | McNay |
| 5,340,054 A | | 8/1994 | Smith et al. |
| 5,699,981 A | | 12/1997 | McGrath et al. |
| 6,206,326 B1 | * | 3/2001 | Stanek et al. |
| 6,296,202 B1 | * | 10/2001 | Stanek |
| 6,375,118 B1 | * | 4/2002 | Kibens et al. |

OTHER PUBLICATIONS

Michael J. Stanek, Copending, Commonly Assigned Patent Application: "High Frequency Pulsed Fuel Injector", AFD 00436, Filed on Even Date.

Michael J. Stanek, Copending, Commonly Assigned Patent Application: "Jet Noise Suppressor", AFD 00435, Filed on Even Date.

Parekh, D.E. et al., *Innovative Jet Flow Control: Mixed Enhancement Experiments*, AIAA Paper No. 96–0308, American Institute of Aeronautics and Astronautics, AIAA, Aerospace Sciences Meeting, 34th, Reno, NV, Jan. 15–18, 1996.

Brocher et al., "Fluid Dynamics of the Resonance Tube" Journal of Fluid Mechanics vol. 43, Part 2 pp. 369–384 (1970).

* cited by examiner

*Primary Examiner*—Charles T. Jordan
*Assistant Examiner*—T. Dinh
(74) *Attorney, Agent, or Firm*—Richard A. Lambert; Bobby D. Scearse; Thomas L. Kundert

(57) ABSTRACT

An aircraft weapons bay high frequency acoustic suppression apparatus is disclosed. The apparatus includes an extendable spoiler retractably received within an aircraft weapons bay. An injector unit is received within the spoiler for injecting high frequency pulses of pressurized gas into the airstream. The injector unit includes a resonance tube in outlet fluid communication with an nozzle. The pulsating output of the resonance tube perturbs the flow of pressurized gas in the nozzle, effectively breaking it up into discrete slugs or pulses which then exit the nozzle and enter the airstream. The high frequency perturbation of the airflow across the weapons bay, created by the aircraft weapons bay high frequency acoustic suppression apparatus of the present invention effectively suppresses undesirable acoustic resonance within the open weapons bay.

7 Claims, 7 Drawing Sheets

AIRCRAFT WEAPONS BAY HIGH FREQUENCY ACOUSTIC SUPPRESSION APPARATUS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to reducing open aircraft cavity acoustic resonance, and more particularly to an apparatus for expelling high frequency pulses of pressurized gas to reduce acoustic resonance within an open weapons bay of an aircraft in flight.

This application is somewhat related to my copending and commonly assigned patent applications "JET NOISE SUPPRESSOR", Ser. No. 09/973,176, "HIGH FREQUENCY PULSED FUEL INJECTOR", Ser. No. 09/973, 161 and filed on even date herewith. The contents of these even filing date applications are hereby incorporated by reference herein.

As is well known, military aircraft sometimes carry weapons to be discharged during flight. The weapons are often carried within one or more cavities, commonly known as weapons bays. The weapons bays usually include a pair of doors, which are opened only when release of the weapon stores is anticipated. During the remainder of the aircraft flight, the weapons bay doors are closed, presenting a smooth surface to enhance aerodynamic performance as well as other characteristics, such as stealthiness, for example.

When the weapons bay doors are opened in flight, a thin region called a shear layer is created wherein the airflow abruptly transitions from a low speed flow inside the cavity to a high speed flow outside the cavity. This shear layer is characterized by instability which causes the shear layer to form tight, circular rotating pockets of flow commonly referred to as vortices. These vortices impinge on the rear wall of the cavity causing high levels of resonance and high acoustic levels inside the weapons bay. This acoustic resonance can be strong enough to damage the aircraft or its systems, and, therefore, is quite undesirable.

Attempts have been made in the past to reduce acoustic resonance occurring within an open aircraft weapons bay. For example, U.S. Pat. No. 5,699,981 to McGrath et al. describes a system incorporating a cylindrical member disposed on the surface of the aircraft near the leading edge of the cavity. The cylindrical member is projected into the airflow of aircraft in flight to create vortices to reduce acoustic resonance. Similarly, U.S. Pat. No. 5,340,054 to Smith et al. describes an apparatus for acoustic reduction using a series of perturbation pins placed on the surface of the aircraft for generating vortices to disrupt the shear layer, for the purpose of reducing acoustic resonances within an open cavity. While somewhat effective, these prior art systems are not without the need for improvement. For example, these patents describe systems requiring the attachment of structures onto the surface of the aircraft, increasing drag as well as significantly interrupting the desirable smooth aircraft surface. Moreover, their effectiveness decreases dramatically at aircraft speeds up to and exceeding Mach 1.

A system recently described by Parekh, D. E. et al., *Innovative Jet Flow Control: Mixing Enhancement Experiments*, AIAA Paper No. 96-0308, American Institute of Aeronautics and Astronautics, AIAA, Aerospace Sciences Meeting, 34th, Reno, Nev., Jan. 15–18, 1996, includes vibrating wedges driven by piezoelectric actuators. This system, while providing the proper high frequency range of operation, is unsuited for application to the weapons bay problem because it is incapable of providing sufficient amplitude.

Another recent system for providing the desirable high frequency suppression operation is described in my U.S. Pat. No. 6,296,202 entitled Aircraft Weapons Bay Acoustic Suppression Apparatus, assigned to the assignee of the present invention. This acoustic suppression device utilizes an oscillatable spoiler plate which is extended into the airstream. At least one shaker is placed in operative engagement with the spoiler plate in order to oscillate the spoiler plate at high frequencies and high amplitudes to seed the shear layer with frequencies which directly complete with the natural frequency of the shear layer vortices.

This system represents a distinct improvement over the prior art because it provides high amplitude oscillation in addition to the high frequency operation. This desirable high amplitude operation is not obtainable with the prior art systems such as Parekh's described above.

While my system represents a significant advancement over the earlier acoustic suppression systems, further improvement and refinement is desirable. More specifically, in certain situations, electromechanical devices of this type might weigh too much, or might consume too much electrical power. Also, it is well known that mechanical devices with moving parts are subject to failure and maintenance requirements. In these situations a light weight device including an injector having no moving parts might be desirable.

A need exists therefore for an improved aircraft weapons bay acoustic suppression apparatus. Such an apparatus would provide improved high frequency acoustic resonance reduction, enhancing aircraft operation as well as aircraft longevity.

SUMMARY OF THE INVENTION

Accordingly, it is a primary object of the present invention to provide an aircraft weapons bay high frequency acoustic suppression apparatus overcoming the limitations and disadvantages of the prior art.

Another object of the present invention is to provide an aircraft weapons bay high frequency acoustic suppression apparatus providing acoustic resonance reduction over a wide range of aircraft operating conditions.

It is yet another object of the present invention to provide an aircraft weapons bay high frequency acoustic suppression apparatus which can be utilized on a wide variety of aircraft.

It is still another object of the present invention to provide an aircraft weapons bay high frequency acoustic suppression apparatus that includes an injector unit for injecting high frequency pulses of pressurized gas into the airstream.

Still another object of the present invention is to provide an aircraft weapons bay high frequency acoustic suppression apparatus including an injector unit having no moving parts.

These and other objects of the invention will become apparent as the description of the representative embodiments proceeds.

In accordance with the foregoing principles and objects of the invention, an aircraft weapons bay acoustic suppression apparatus is provided to dramatically reduce acoustic resonance within an open weapons bay of an aircraft in flight.

As is known in the art, opening the weapons bay doors in flight gives rise to the creation of a thin region called a shear layer where the airflow abruptly transitions from a low speed flow inside the cavity to a high speed flow outside the cavity. This shear layer is characterized by instability which causes the shear layer to form tight, circular rotating pockets of fluid flow commonly referred to as vortices. These vortices impinge on the rear wall of the cavity and correspondingly generate an acoustic wave which propagates in the opposite way, upstream. The acoustic wave thus generated interacts with the shear layer to influence the size and spacing of the vortices. If the frequency and phase of the acoustic wave coincides with that of the shear layer instabilities, the vortices generated by this "forced" shear layer can become a whole number (1, 2, 3, etc.) with respect to the cavity, generating high levels of undesirable acoustic resonance. The effects of this can often be strong enough to damage the aircraft or its systems, and, as can be appreciated, are quite undesirable.

In accordance with the teachings of the present invention, the aircraft weapons bay high frequency acoustic suppression apparatus includes a spoiler received within the weapons bay. The spoiler is mounted such that it can be retractably extended into the airstream of the aircraft in flight. An injector unit for injecting high frequency pulses of pressurized air into the airstream is received within the spoiler. The injector unit includes a resonance tube and a nozzle having an outlet directed externally from the aircraft, into the airstream.

Resonance tubes are well known in the art. In general, resonance tubes are fluidic devices that receive a pressurized fluid input and provide a pulsating fluid output. The nature of the output, such as pulse frequency and amplitude is variable and depends on the upon the dimensions of the resonance tube.

The resonance tube outlet is placed in fluid communication with a nozzle. During operation of the aircraft weapons bay high frequency acoustic suppression apparatus, the spoiler is extended into the airstream of the aircraft in flight. Compressed air is directed independently into the resonance tube and into the nozzle via inlet valves. The resonance tube provides a pulsating output which is directed into the nozzle. The pulsating output of the resonance tube perturbs the flow of air in the nozzle, effectively breaking it up into discrete slugs or pulses which exit the nozzle and are directed into the airstream.

This high frequency discharge of high pressure gas into the airstream effectively seeds the shear layer with frequencies which directly compete with the natural frequency of the shear layer vortices even at very high aircraft speeds, something heretofore not possible with the acoustic suppression methods of the prior art.

Advantageously and according to an important aspect of the present invention, the injector has no moving parts, enhancing reliability as well as reducing costs. The spoiler can be made according to designs and configurations known to those skilled in this art, reducing cost as well as simplifying retrofit into existing aircraft.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
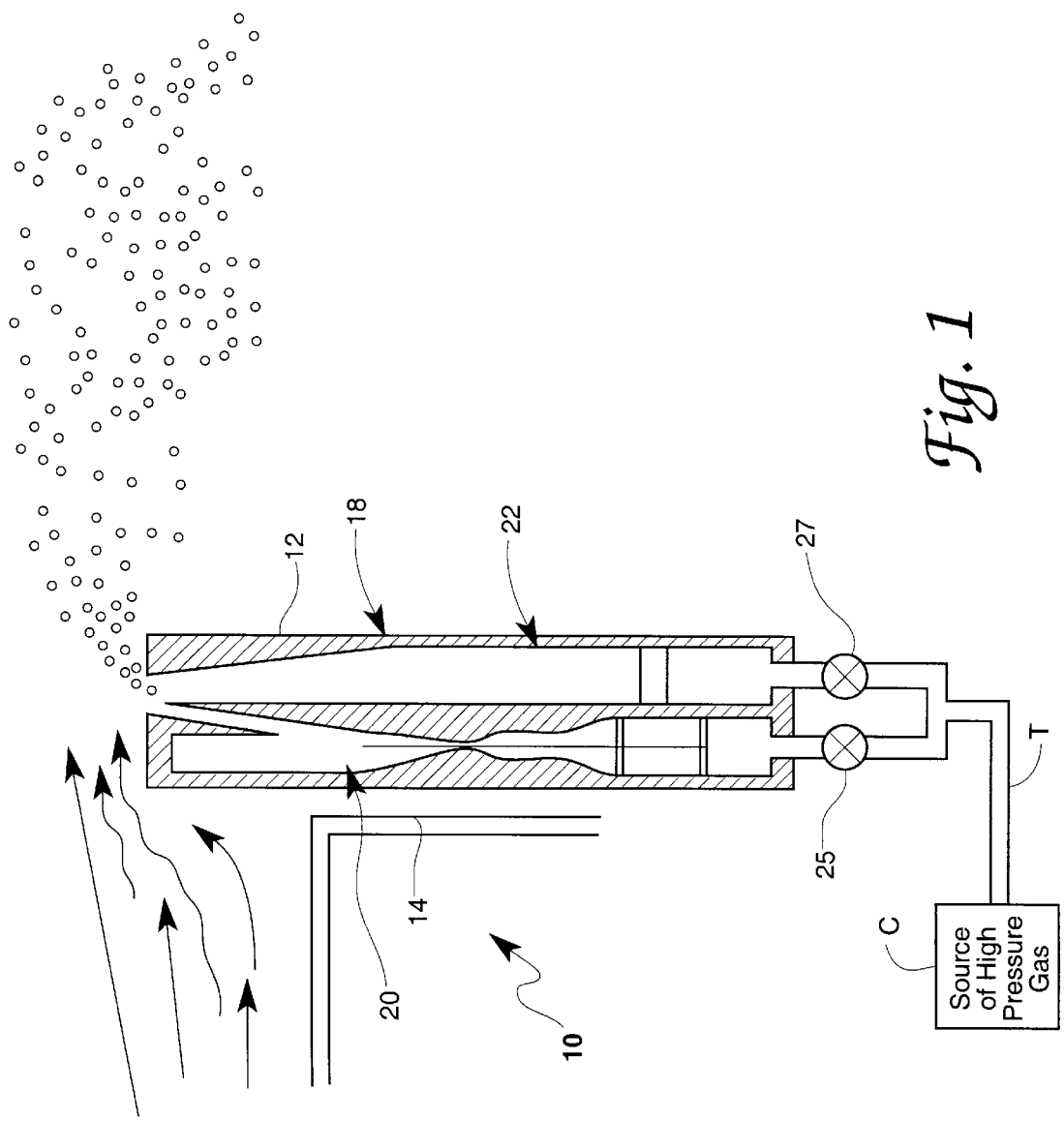
FIG. 1 is a diagrammatic cross sectional view of the aircraft weapons bay high frequency acoustic suppression apparatus extended into the airstream of the aircraft, illustrating the effect upon the airflow across the weapons bay.

Reference is made to FIG. 1 showing the aircraft weapons bay high frequency acoustic suppression apparatus 10 of the present invention. The aircraft weapons bay high frequency acoustic suppression apparatus 10 is provided to dramatically reduce acoustic resonance within an open weapons bay of an aircraft in flight.

Figure 5:
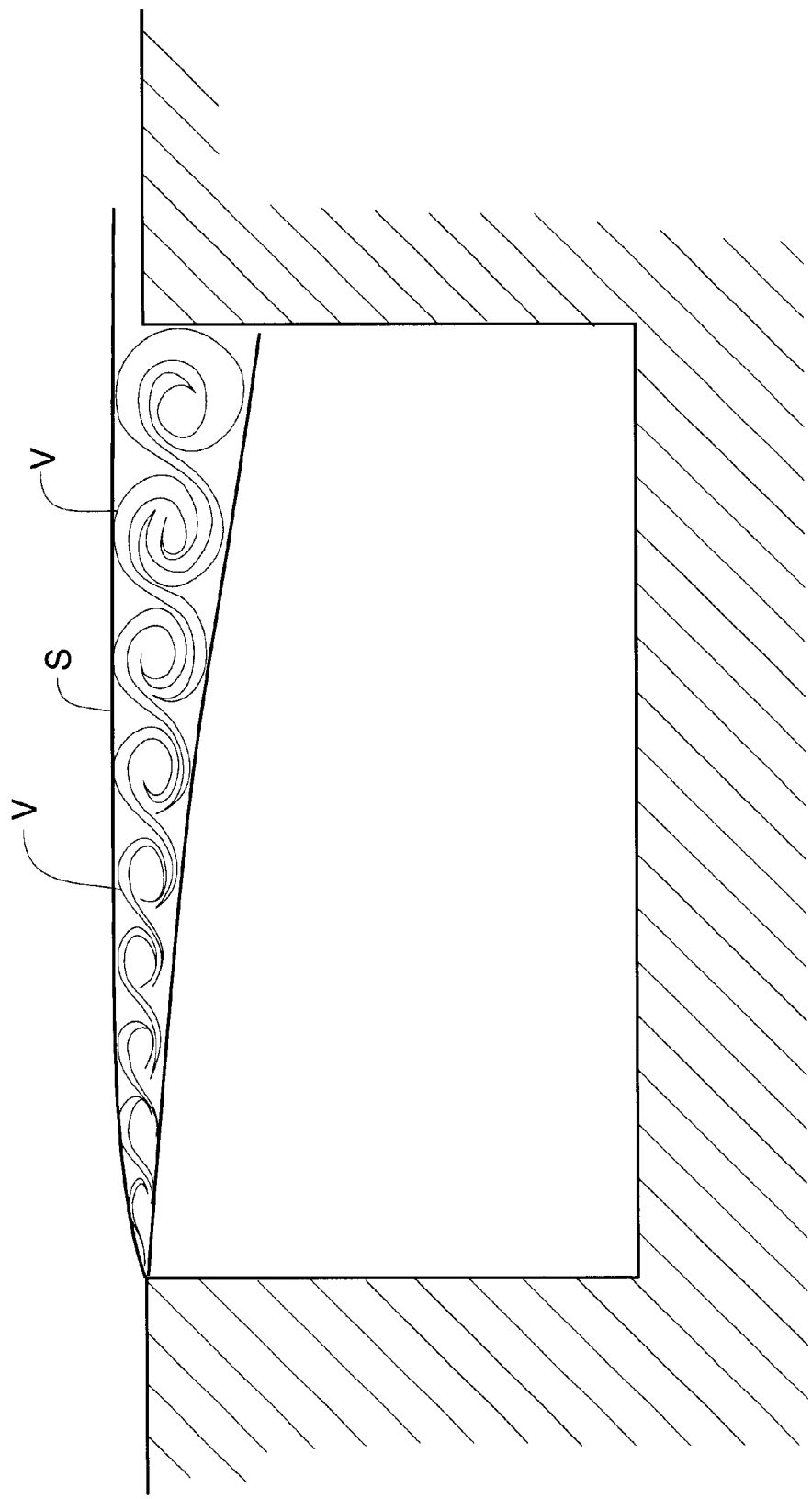
FIG. 5 is a diagrammatic view illustrating the formation of shear layer vortices across an open aircraft weapons bay.

Reference is now directed to FIG. 5 wherein a representative shear layer S is shown having formed across an open cavity or weapons bay of an aircraft in flight. The shear layer S develops as the airflow abruptly transitions from a low speed flow inside the weapons bay to a high speed flow outside the weapons bay. This shear layer S is characterized by an instability which causes the shear layer S to form tight, circular rotating pockets of fluid flow commonly referred to as vortices V to form. These vortices V impinge on the rear wall of the weapons bay and correspondingly generate an acoustic wave (not shown) which propagates in the opposite way, upstream. The acoustic wave thus generated interacts with the shear layer to influence the size and spacing of the vortices. If the frequency and phase of the acoustic wave coincides with that of the shear layer instabilities, the vortices generated by this "forced" shear layer can become a whole number (1, 2, 3, etc.) with respect to the weapons bay, generating high levels of undesirable acoustic resonance. The effects of this can be often be strong enough to damage the aircraft or its systems, and, as can be appreciated, are quite undesirable.

Figure 2:
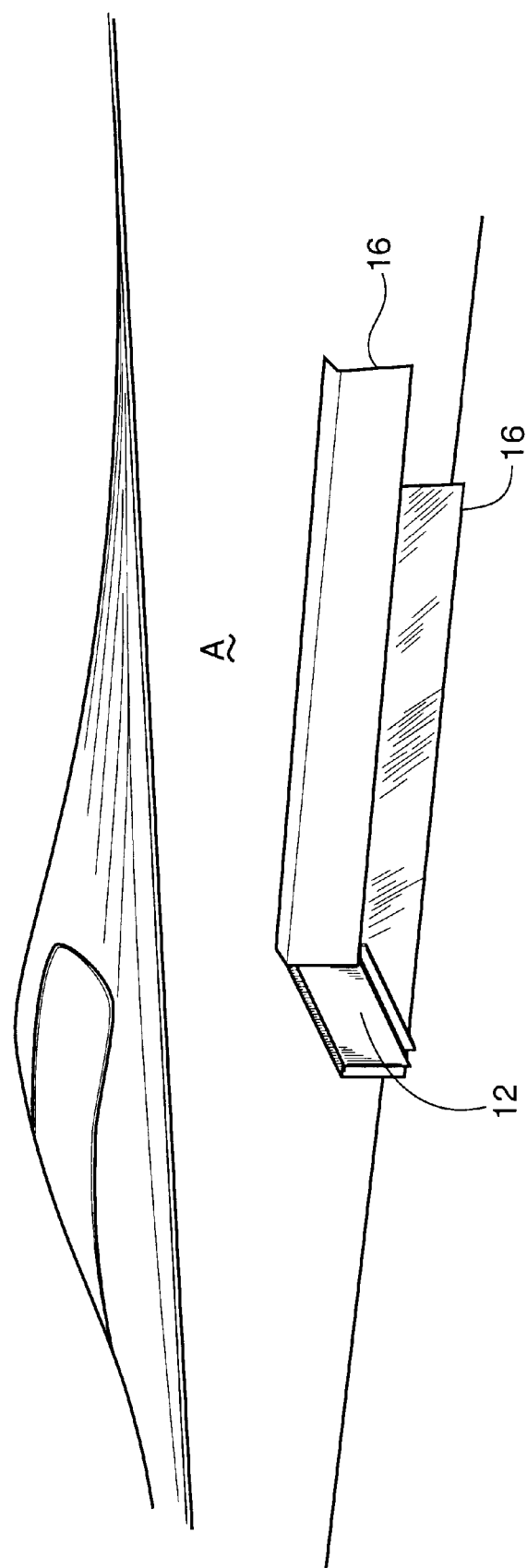
FIG. 2 is a perspective view of the aircraft weapons bay high frequency acoustic suppression apparatus mounted on a representative aircraft, the invention being shown in the extended position.

As shown in FIG. 1, the aircraft weapons bay high frequency acoustic suppression apparatus 10 includes an extendable spoiler 12 received within the weapons bay 14 of the aircraft. Extendable or deployable spoilers are well known and are commonly used on a wide variety of military aircraft to assist in weapons separation. As is known, the aircraft spoiler 12 is usually retained within the weapons bay 14 adjacent the leading edge thereof, and is extended into the airstream after the weapons bay doors 16 are opened in preparation for weapons release, not shown. As shown in FIG. 2 in particular, the spoiler 12 is usually aligned perpendicularly to the direction of airflow, and usually traverses the entire width of the weapons bay 14. Mechanisms for extending/retracting spoilers are known to those skilled in the art, and do not form a part of the present invention.

The aircraft weapons bay high frequency acoustic suppression apparatus 10 of the present invention includes an injector unit 18. The injector unit 18 includes a resonance tube 20 in outlet fluid communication with a nozzle 22. As will be described in more detail below, the operative combination of the resonance tube 20 and the nozzle 22 provides a high frequency pulsating discharge of high pressure gas. This pulsed discharge effectively perturbs the airflow across the open weapons bay 14 so as to directly compete with the natural frequency of the shear layer vortices. This causes the desired reduction in acoustic resonance by drawing energy away from the lower frequencies, suppressing all dominant weapons bay tones simultaneously.

Advantageously, this high frequency method of acoustic resonance reduction provides the same levels of acoustic reduction throughout the range of anticipated aircraft speeds. This is not possible with the low frequency systems of the prior art, and it should be realized, too, that the aircraft weapons bay high frequency acoustic suppression apparatus of the present invention operates autonomously, requiring no complex control or feedback mechanisms, again a distinct advantage over many of the prior art systems.

The resonance tube 20 and the nozzle 22 are preferably formed within the body of the spoiler 12, but can also be formed within a common housing not shown. In this way, the injector unit 18 is usually retained within the spoiler 12, but, when formed within a separate housing, can be attached externally to the spoiler 12, if desired, in order to facilitate retrofit in some situations.

Figure 3:
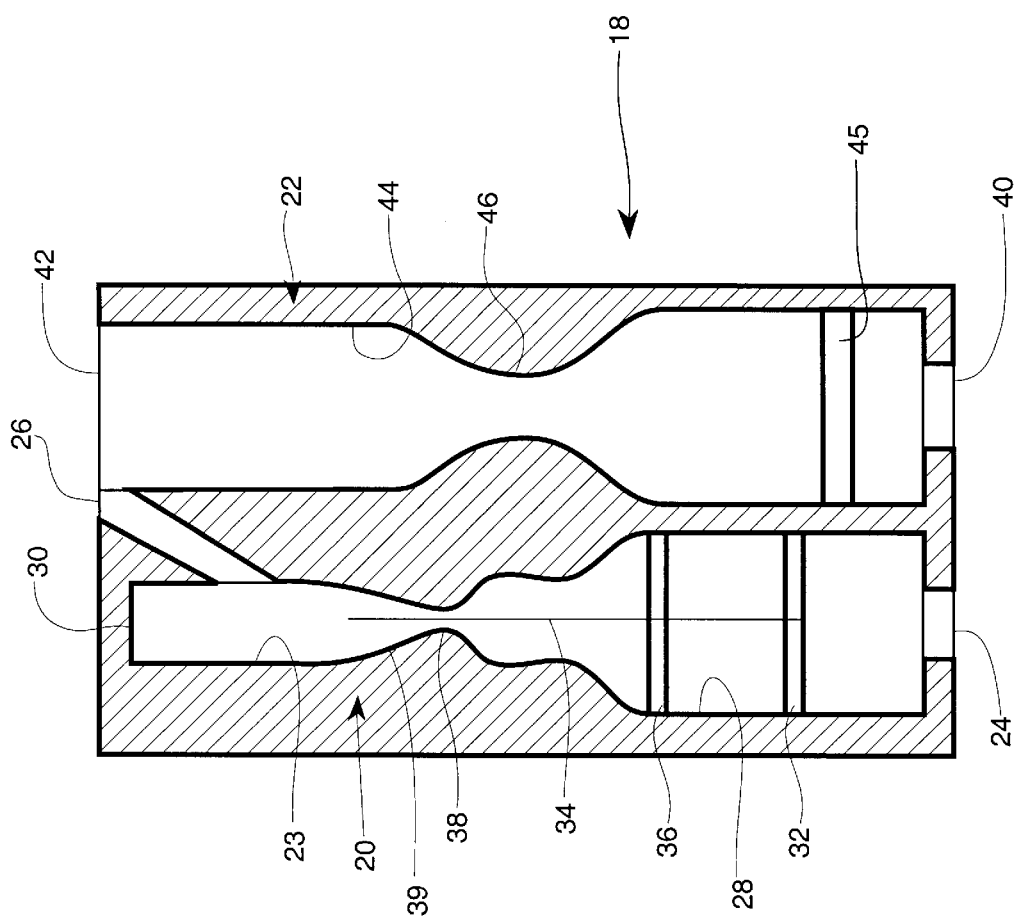
FIG. 3 is a cross sectional view of the injector unit of the aircraft weapons bay high frequency acoustic suppression apparatus, shown in supersonic configuration.

Resonance tubes are well known in the art. Background material related to resonance tubes which may be helpful in understanding the invention may be found by reference to "Fluid Dynamics of the Resonance Tube", by Brocher et al., J. Fluid Mech. (1970) Vol. 43, Part 2, pp. 369–384, Great Britain, and the references cited therein, the entire teachings of which are incorporated by reference herein. Generally, and as shown in FIG. 3, the resonance tube 20 includes an inlet 24 and an outlet port 26. The resonance tube 20 receives pressurized gas, which in the preferred embodiment is compressed air through the inlet 24. The pressurized gas is received from a high pressure source C which can be an air compressor or perhaps a gas turbine compressor discharge port. Suitable conduit or tubing T connects the high pressure gas to the inlet 24 of the resonance tube 20. Inlet valves 25 and 27 are provided in the tubing T and are independently operable. When opened, the valves 25, 27 direct the flow of high pressure gas into the resonance tube 20 and the nozzle 22, respectively. The gas expands and travels down the bore 28 of the resonance tube 20 from the inlet 24 through an internal converging/diverging section 38. The gas exits the internal converging/diverging section 38 via the diverging outlet 39. As the gas travels down the constant diameter section 23 of the tube 20 (from the outlet 39 to the end wall 30), it sets up compression waves (not shown). The reflection of the compression wave from the end wall 30, and a subsequent reflected expansion wave (also not shown), serve to cause a backward flow from the end wall 30 to the outlet port 26. As the compressed gas escaping from the constant diameter section 23 of the resonance tube 20 encounters the gas flowing from the outlet 39 of the internal converging/diverging section 38, an opposition is created, initiating a cyclical pulsed discharge from the outlet port 26. Generally, the frequency of this resonance is dependent on the length of the resonance tube 20 and the amplitude of the pulsed discharge depends primarily on the Mach number of the incoming flow.

The resonance tube 20 also contains a perforated flow straightener 32 to refine and condition the flow of the pressurized gas. A center rod 34 is provided in order to impart a degree of drag to the air flow in order to slow down a part of the flow. This results in a more pronounced pulsed discharge through the outlet port 26, enhancing operation. A rod support 36 may be utilized, if desired, in order to retain the center rod 34 in the correct position. In the preferred embodiment, the rod support 36, has an "X" cross section to retain the center rod 34 in position while not impeding the air flow within the bore 28. As described above, an internal converging/diverging section 38 is formed within the bore 28.

Similar to the resonance tube 20, the nozzle 22 includes, an inlet 40, an outlet 42, and an internal nozzle bore 44. The high pressure gas is delivered to the inlet 40 via the tubing T from the high pressure source C. The resonance tube 20 also preferably contains a perforated flow straightener 45 to refine and condition the flow of the pressurized gas. The size and internal configuration of the nozzle bore 44 can be altered to suit the operating conditions of the aircraft. For example, as shown in FIG. 3, the nozzle bore 44 includes an internal converging/diverging section 46 and a wide outlet 42. This configuration would be used for applications requiring supersonic injection flow. Conversely, the nozzle 22 shown in FIG. 4 includes a straight bore, without the nozzle converging/diverging section 46 and instead includes a converging section 48 adjacent the nozzle outlet 42. This configuration would be used for applications requiring subsonic injection flow.

Figure 4:
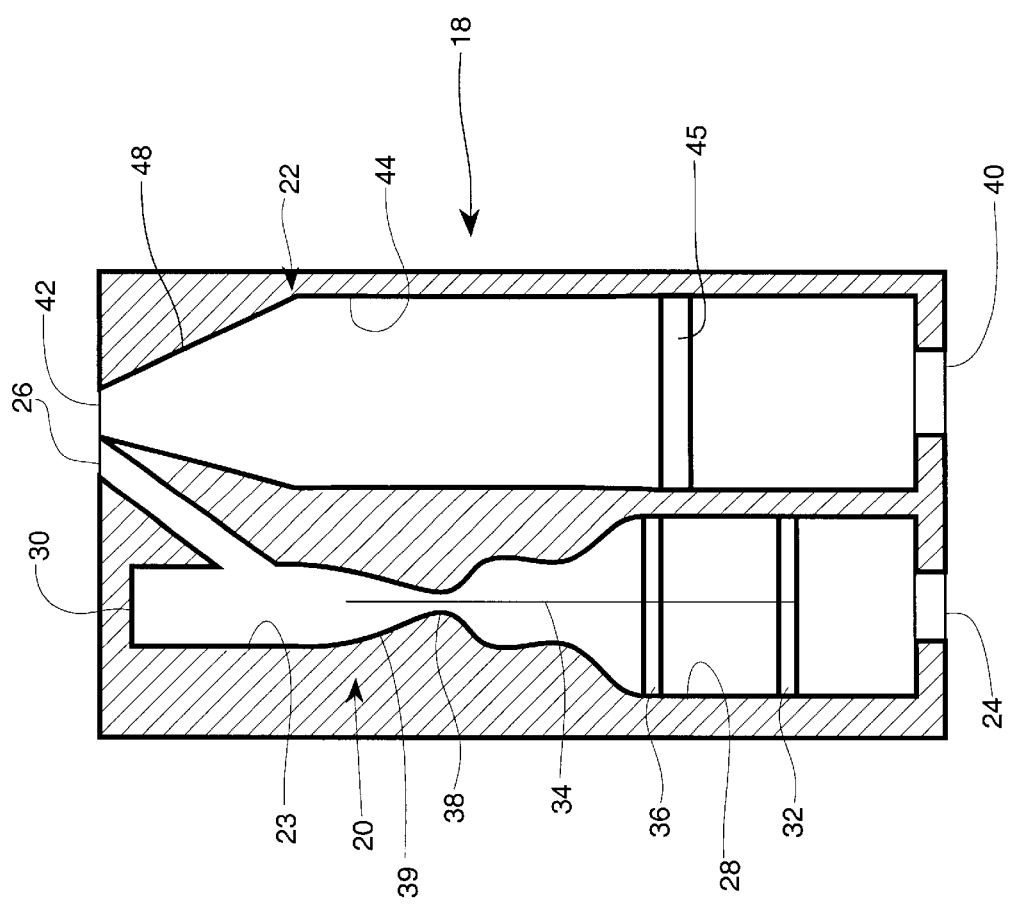
FIG. 4 is a cross sectional view of the injector unit of the aircraft weapons bay high frequency acoustic suppression apparatus, shown in subsonic configuration.

According to an important aspect of the present invention, and as shown in FIGS. 1, 3 and 4, the outlet port 26 of the resonance tube 20 is connected directly to the nozzle 22. The pulsating output of the resonance tube 20, as described above, perturbs the flow of gas within and immediately after exiting the nozzle 22, effectively breaking it up into discrete slugs or pulses which enter the airstream. While it is contemplated that in most situations, the inlet valves 25, 27 would be opened to enable simultaneous operation of the resonance tube 20 and the nozzle 22, it may be desirable, in some situations, to operate them independently. For example, it may be desirable to close the inlet valve 25 leading to the resonance tube 20 in order to operate the nozzle 22 independently for a brief time during weapons release to enhance the separation of the weapon from the aircraft. A description of this active enhancement of weapons separation is described in my U.S. Pat. No. 6,206,326, the contents of which are incorporated by reference herein.

Figure 7:
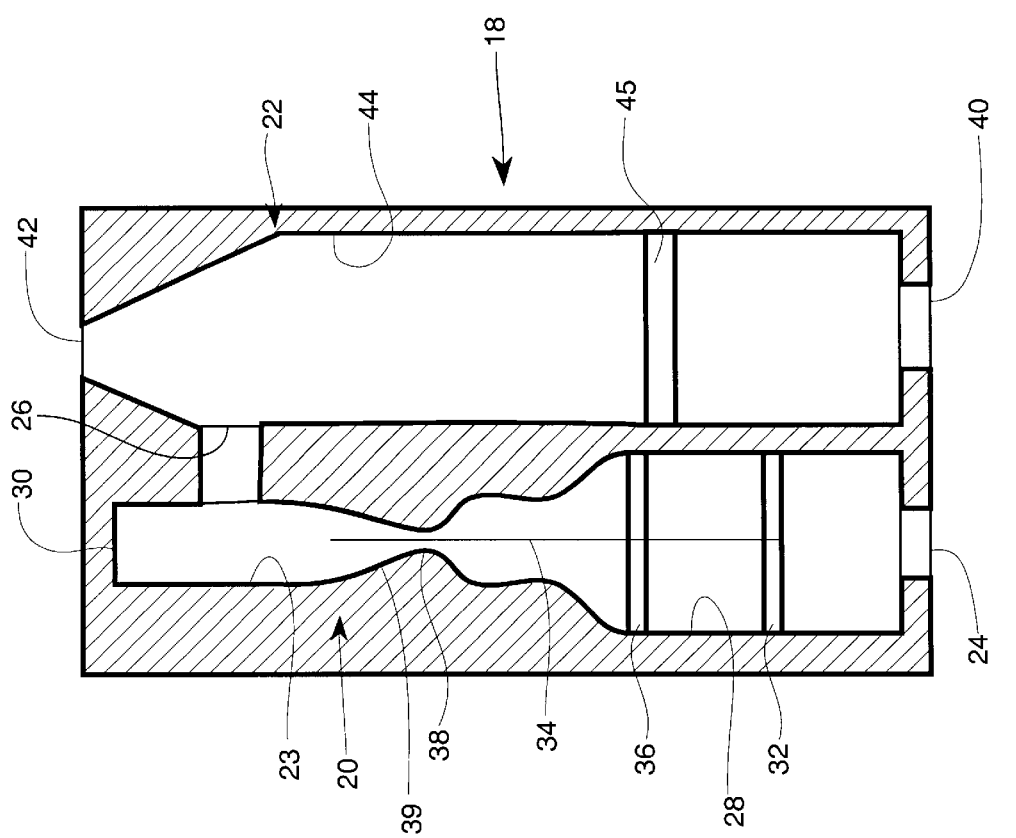
FIG. 7 is a cross sectional view of the aircraft weapons bay high frequency acoustic suppression apparatus showing the resonance tube outlet port connecting the nozzle at a normal angle to the longitudinal axis of the nozzle.

The outlet port 26 connection to the nozzle 22 can be formed in several configurations. For example, the connection can be at an angle normal to the longitudinal axis of the nozzle, as shown in FIG. 7, or it can be at an oblique angle as shown, for example, in FIGS. 1, 3 and 4.

As stated previously, this pulsed discharge causes the desired reduction in acoustic resonance by drawing energy away from the lower frequencies, suppressing all dominant weapons bay tones simultaneously. Advantageously, the aircraft weapons bay high frequency acoustic suppression apparatus of the present invention provides acoustic reduction even at very high aircraft speeds, something heretofore not possible with the acoustic suppression methods of the prior art.

Figure 6:
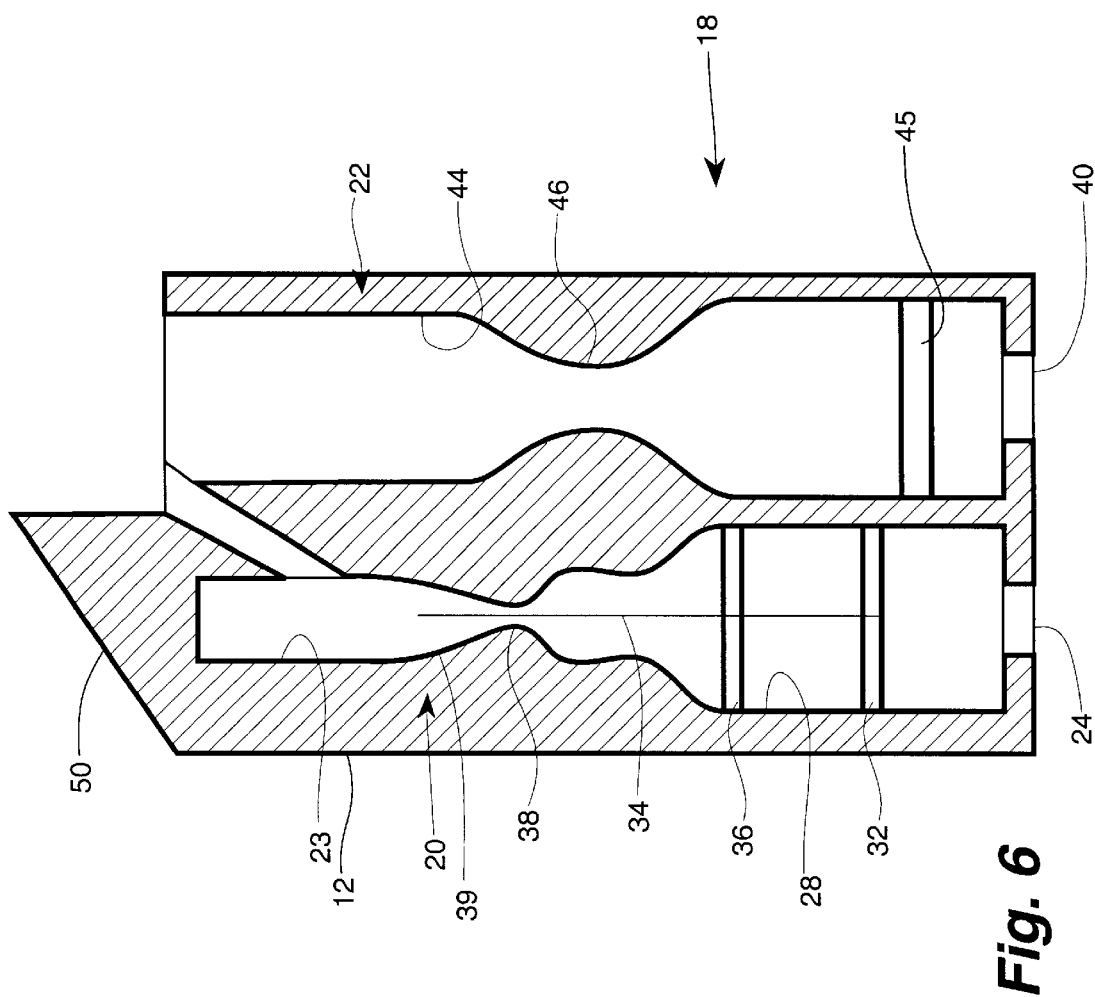
FIG. 6 is a cross sectional view of an alternative embodiment of the aircraft weapons bay high frequency acoustic suppression apparatus.

In an alternative embodiment of the aircraft weapons bay high frequency acoustic suppression apparatus of the present invention, the spoiler 12 includes a ramp edge 50. Reference is directed to FIG. 6, showing the ramp edge 50 of the spoiler 12. This provides an extended edge to allow for recirculation and enhanced mixing of the perturbations as they exit the nozzle 22.

In summary, numerous benefits have been described from utilizing the principles of the present invention. The aircraft weapons bay high frequency acoustic suppression apparatus 10 the present invention provides for dramatic reductions in aircraft weapons bay acoustic levels throughout the anticipated range of aircraft speeds. The aircraft weapons bay high frequency acoustic suppression apparatus 10 of the present invention includes an injector unit 18 for injecting a pulsed discharge of high pressure air to perturb the airflow across the open weapons bay 14.

The foregoing description of the preferred embodiment has been presented for purposes of illustration and description. It is not intended to be exhaustive or to limit the invention to the precise form disclosed. Obvious modifications or variations are possible in light of the above teachings. For example, several injector units 18 can be incorporated within the spoiler 12 to provide enhanced mixing or to accommodate wide weapons bays. As another example, the outlet nozzle 42 can be oriented at angles other than normal to the edge of the spoiler, such as upstream, downstream right or left. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An apparatus for reducing acoustic resonance within an open cavity of an aircraft, comprising:

a spoiler received within the cavity, said spoiler being extendable into the airstream of the aircraft in flight;

an injector unit within said spoiler for injecting high frequency pulses of pressurized gas into the airstream, said injector unit having a resonance tube in outlet fluid communication with a nozzle, said nozzle having an outlet directed externally, into the airstream; and, a source of high pressure gas for said injector unit.

2. The apparatus of claim 1 wherein said nozzle includes an internal perforated flow straightener.

3. The apparatus of claim 1 wherein said nozzle includes an internal converging/diverging portion.

4. The apparatus of claim 1 wherein said nozzle includes an internal converging portion.

5. The apparatus of claim 1 wherein said resonance tube outlet meets said nozzle at an angle normal to the longitudinal axis of said nozzle.

6. The apparatus of claim 1 wherein said resonance tube outlet meets said nozzle at an angle oblique to the longitudinal axis of said nozzle.

7. The apparatus of claim 1 wherein said gas is air.

* * * * *